United States Patent [19]

Dick

[11] 4,121,053

[45] Oct. 17, 1978

[54] TELEPHONE COMMAND APPARATUS

[76] Inventor: William J. Dick, 188-20A 69th Ave., Flushing, N.Y. 11365

[21] Appl. No.: 793,958

[22] Filed: May 5, 1977

[51] Int. Cl.² .................................... H04M 11/00
[52] U.S. Cl. ........................ 179/2 A; 340/171 A; 179/84 VF
[58] Field of Search ............ 179/2 A, 18 D, 81 R, 179/84 R, 84 C, 84 VF, 18 DA, 89; 340/171 A, 163

[56] References Cited

U.S. PATENT DOCUMENTS

| 3,647,971 | 3/1972 | Cushman | 179/2 A |
| 3,654,396 | 4/1972 | Biezeveld | 179/18 D |
| 3,829,616 | 8/1974 | Blouch | 179/2 A |
| 4,006,316 | 2/1977 | Bolgiano | 179/2 A |

*Primary Examiner*—Kathleen H. Claffy
*Assistant Examiner*—Joseph A. Popek
*Attorney, Agent, or Firm*—Brumbaugh, Graves, Donohue & Raymond

[57] ABSTRACT

Telephone command apparatus responsive to ringing current on a telephone line includes a decoder responsive to upper and lower frequency components of two-tone signals and an access and lockout device responsive to decoded signals representative of a correct sequence of two-tone signals for terminating the incoming telephone line and enabling a plurality of relays for actuation selectively in response to other two-tone signals received over the telephone line to initiate and complete one or more operations at the called location. Until the correct sequence of two-tone signals is received, the command apparatus has no effect on the telephone line to which it is connected and the line functions in the normal way. Transmittal of an incorrect series of two-tone signals to the access and lockout device disables the command apparatus and renders it incapable of responding to incoming signals for a predetermined period of time. Selected interrogating two-tone signals transmitted by the caller condition an oscillator to generate audible signals of different frequency to indicate the "on" or "off" status of a selected operation. Relay means responsive either to a selected two-tone signal or to a dial tone or other permanent signal on the line disconnects the command apparatus from the line and readies it for the next incoming call.

16 Claims, 6 Drawing Figures

FIG. 2

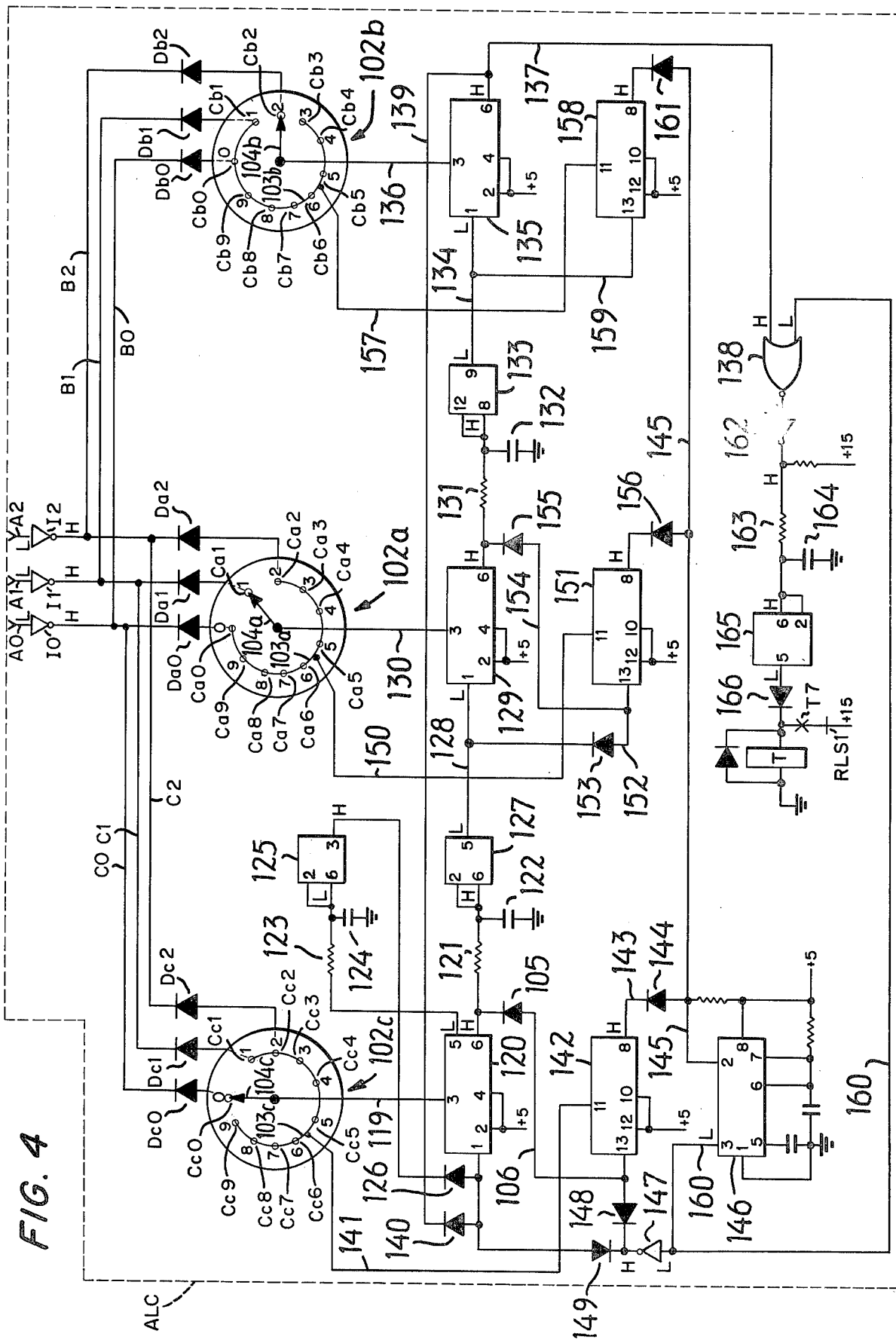

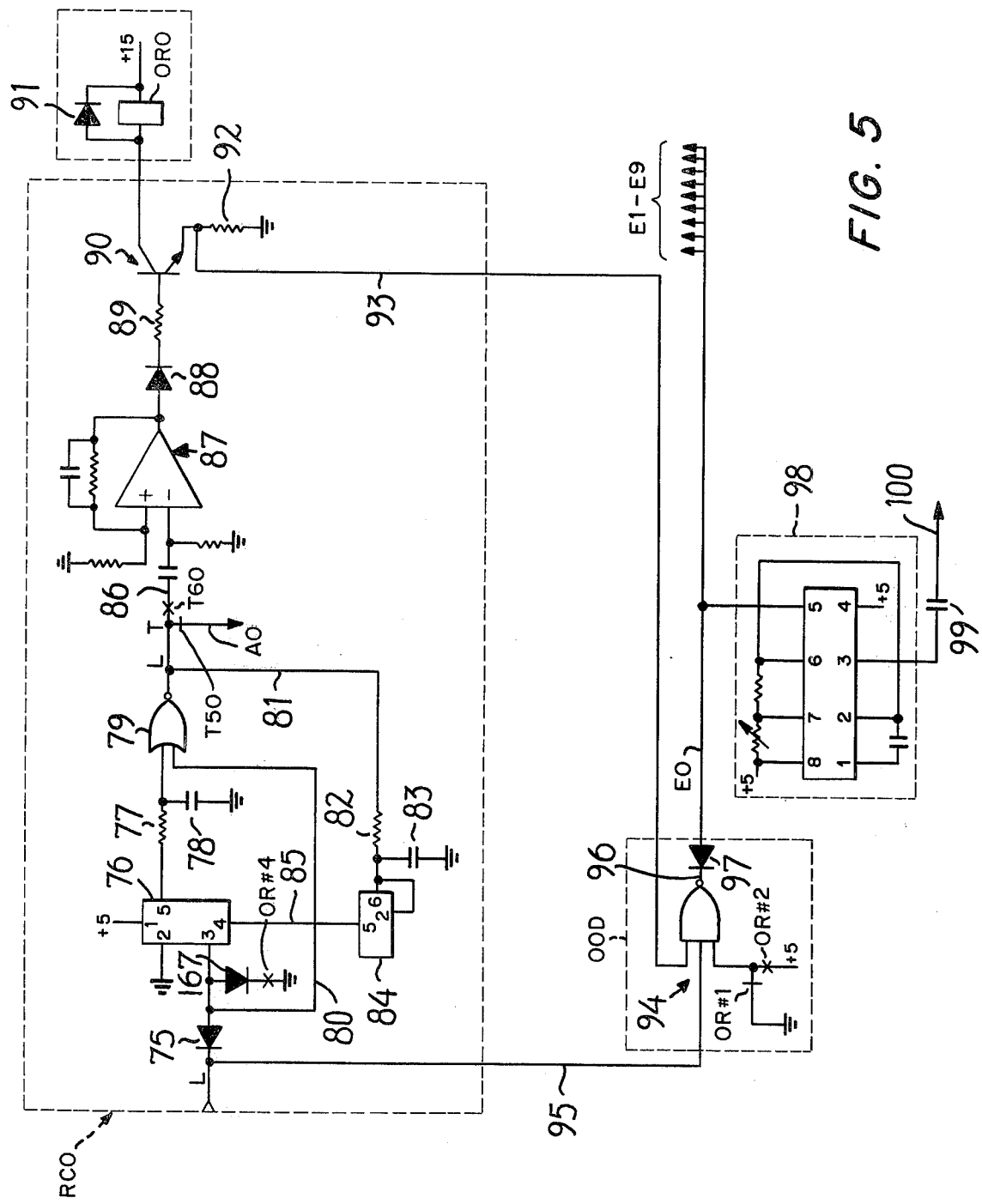

TELEPHONE COMMAND APPARATUS

BACKGROUND OF THE INVENTION

The present invention relates to telephone equipment and more particularly to telephone command apparatus selectively controllable by a caller to cause the apparatus to execute one or more functions for which it has been programmed.

Apparatus is known whereby a caller at a remote location can dial a special number which will put him in communication with central equipment at his office or plant and enable him to utilize such central equipment from the remote location in much the same way as it would be used by a caller located at the plant or office. A special number is required to secure access to such central equipment, however, and once access has been secured the equipment functions in essentially the same way as it does in response to a call originating at the plant.

SUMMARY OF THE INVENTION

It is an object of the invention to provide a new and improved telephone apparatus enabling a caller to place a call to a selected telephone number and thereafter, in respnse to coded information dialed at the calling number to acquire control of command apparatus located at the called number.

Another object of the invention is to provide new and improved telephone apparatus of the above character in which any error in dialling the coded information required to enable the caller to acquire control of the command apparatus disables it and renders it non-responsive to further incoming signals for a predetermined interval of time.

A further object of the invention is to provide new and improved telephone apparatus of the above character which enables the caller, after having acquired control of the command apparatus, selectively to initiate and complete one or more functions for which the apparatus has been programmed, in response to coded information dialled at the calling number.

Still another object of the invention is to provide new and improved telephone apparatus of the above character which enables the caller, after having acquired control of the command apparatus, to ascertain the then status of a function for which the apparatus has been programmed, in response to further coded information dialled at the calling number.

Yet another object of the invention is to provide new and improved telephone apparatus of the above character in which the caller may release the command apparatus either by dialling coded information for this purpose or by hanging up the calling receiver.

According to the invention, telephone command apparatus is provided which, in response to the ringing signal which initiates an incoming call at a called number, is connected to receive from the telephone line coded two-tone signals dialled by a caller. The dialled two-tone signals are separated into high and low frequency components by high and low frequency filters and fed to a tone decoder. The decoded tone signals appearing at the output of the decoder are connected to a plurality of output relay control circuits, respectively, which are adapted to energize selectively a plurality of output relay circuits.

In order to limit access to the telephone command apparatus only to authorized callers, signals from output relay control circuits representing digits dialled by a caller are fed to a multiple digit access and lockout device which affords access to the output relay circuits only if such signals represent a given set of digits in a predetermined sequence. If any of the digits or if the sequence of the digits is incorrect, the device is automatically disabled and rendered non-responsive to incoming signals for a predetermined time interval.

During the period between initiation of the ringing signal and receipt of the signals representing the correct access code, the command apparatus has no effect on the telephone line to which it is connected so that the line can function in the usual way.

When the access and lockout device receives signals representing the correct digits in the proper sequence, however, it trips the incoming call to the telephone command apparatus and terminates the telephone line in the conventional manner. This causes the ringing current to cease and conditions the output relay control circuits to route output signals therefrom to the respective output relay circuits. In the terminated condition, the telephone command apparatus can receive tone command signals sent by the caller from either a local or distant station to initiate and complete one or more selected operations at the called number. Such operations may include, for example, turning a light or other device on or off, or connecting the telephone line to a speaker phone at the called number.

The invention also contemplates the provision of means for verifying the on or off status of any of the operations for which the command apparatus is programmed. In addition, apparatus according to the invention incorporates means actuatable by the caller or rendered effective automatically when he hangs up at the end of a call to release the phone command apparatus, readying it to receive another incoming call.

DESCRIPTION OF THE PREFERRED EMBODIMENT

The invention may be better understood from the following detailed description of a representative embodiment, taken in conjunction with the accompanying drawings in which:

FIG. 2 is a schematic diagram of the input terminating circuit, the dial tone detector and the release relay of the apparatus shown in FIG. 1;

FIG. 4 is a schematic diagram of a three-digit access code and lockout circuit forming part of the apparatus shown in FIG. 1;

FIG. 5 illustrates schematically one of the relay control circuits in the apparatus of FIG. 1, together with its output relay and on off detector and the system release oscillator.

Figure 1:
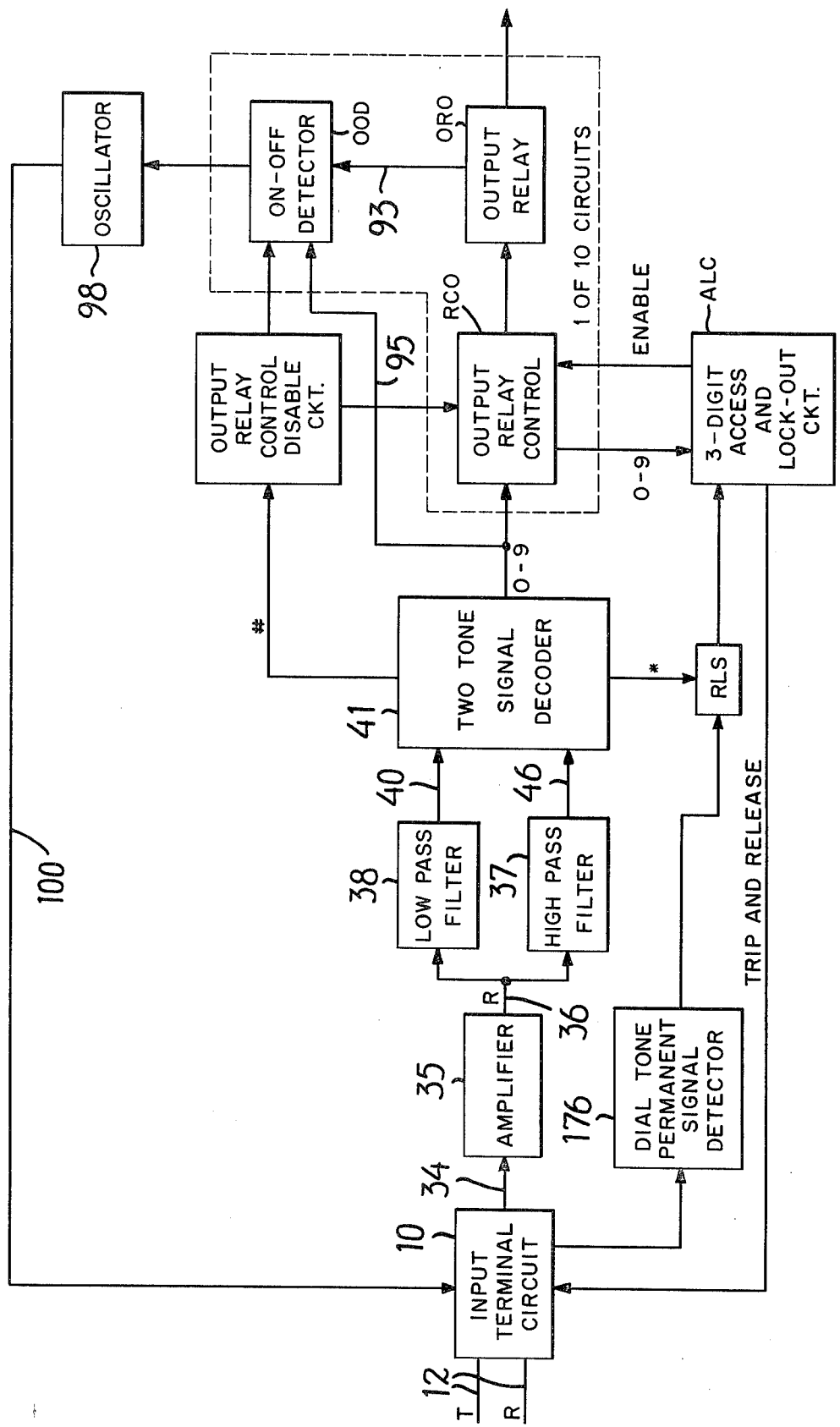
FIG. 1 is a block diagram of telephone command apparatus constructed according to the invention.
Figure 2:
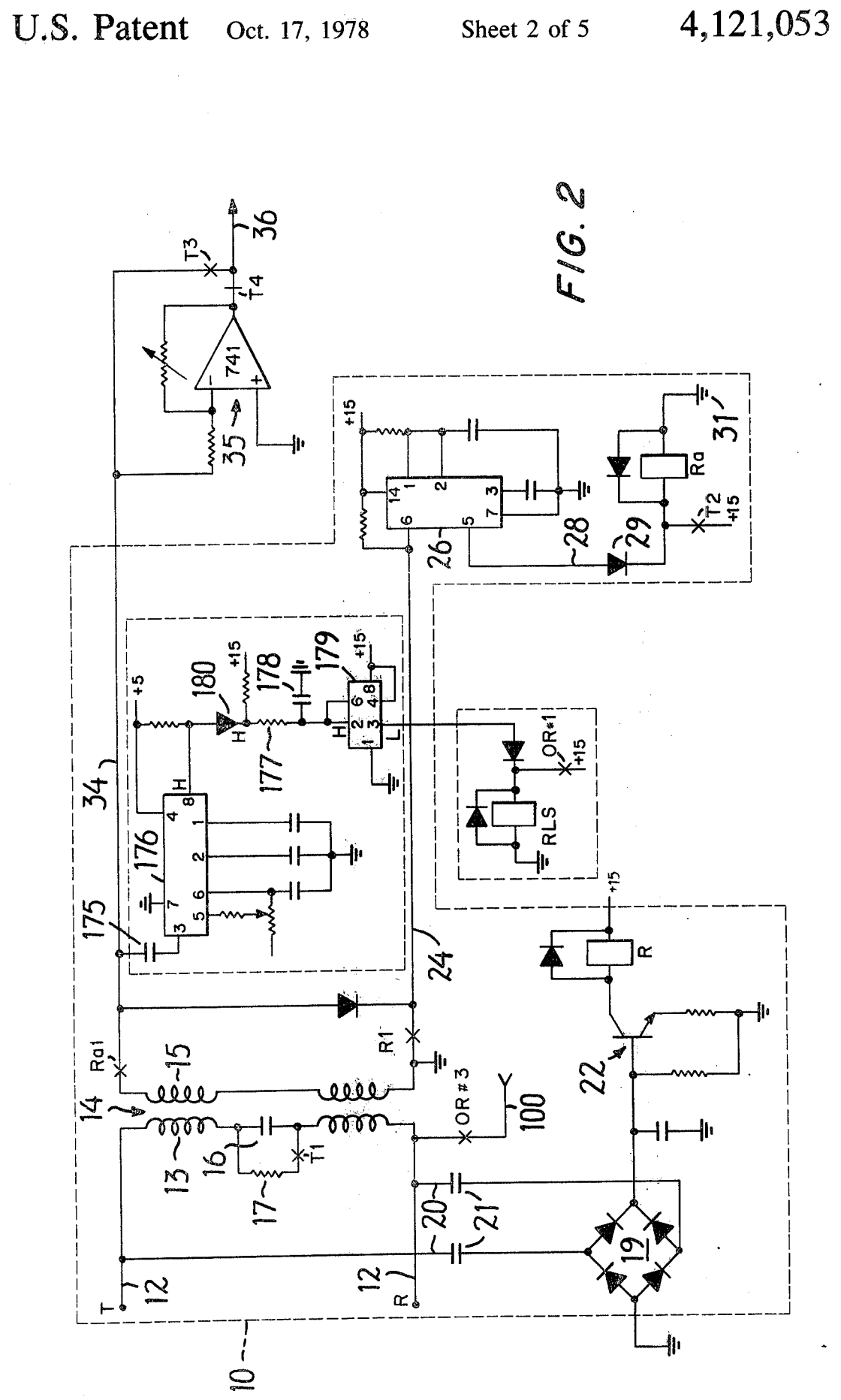

Referring to FIGS. 1 and 2, the command control apparatus comprises an input terminal circuit 10 having conventional ringing current detector means connected to the conductor pair 12 of an incoming telephone line. The telephone line 12 is also connected to the primary winding 13 of a transformer 14 have a secondary winding 15. The transformer primary winding 13 is divided into two halves connected in series by a capacitor 16 which is shunted by a resistor 17 through the normally open contact T1 on a Relay T (FIG. 4).

As shown in FIG. 2, the ring detector comprises a conventional diode bridge 19 having an input diagonal connected to receive ringing current from the incoming pair 12 through the conductors 20 and capacitors 21 and an output diagonal connected to supply a d.c. signal from the bridge 19 between ground and the base of a transistor 22. Upon receipt of such signal, the transistor 22 energizes a relay R having a normally open contact R1. Upon energization of the relay R, the contact R1 connects the grounded lower end of the transformer secondary winding 15 through a conductor 24 to the "6" input terminal of a conventional type 556 timer 26, causing the "5" output terminal of the latter to go high immediately and to remain high for a period of, say, forty seconds.

The high output at the "5" terminal of the timer 26 is supplied through a conductor 28 and a diode 29 to one terminal of a relay Ra, the other terminal of which is grounded at 31. The ungrounded side of the relay Ra is also connected through a normally open contact T2 on the relay T (FIG. 4), to a positive 15 volt source.

Upon energization of the relay Ra, its normally open relay contact Ra1 is closed to connect the upper end of the transformer secondary winding 15 through a conductor 34 to the input of an amplifier circuit 35 which may be, for example, a conventional type 741 operational amplifier designed to pass two-tone signals of the frequencies generated by the conventional "Touch-tone" telephone. As described later, it is desirable under certain conditions to by-pass the amplifier 35 and to this end its input and output terminals are connected together through a normally open contact T3 on the relay T (FIG. 4).

The output of the amplifier 35 is fed through a normally closed contact T4 on the relay T and the conductor 36 to the inputs of conventional high and low pass filters 37 and 38 which are designed to separate into their high and low frequency components conventional "Touch-tone" signals received over the incoming telephone line pair 12. Thus, the filter 37 may be designed to pass only frequencies above, say 1180 Hz., while the filter 38 may be designed to pass only frequencies up to, say 965 Hz.

Figures 3, 6:
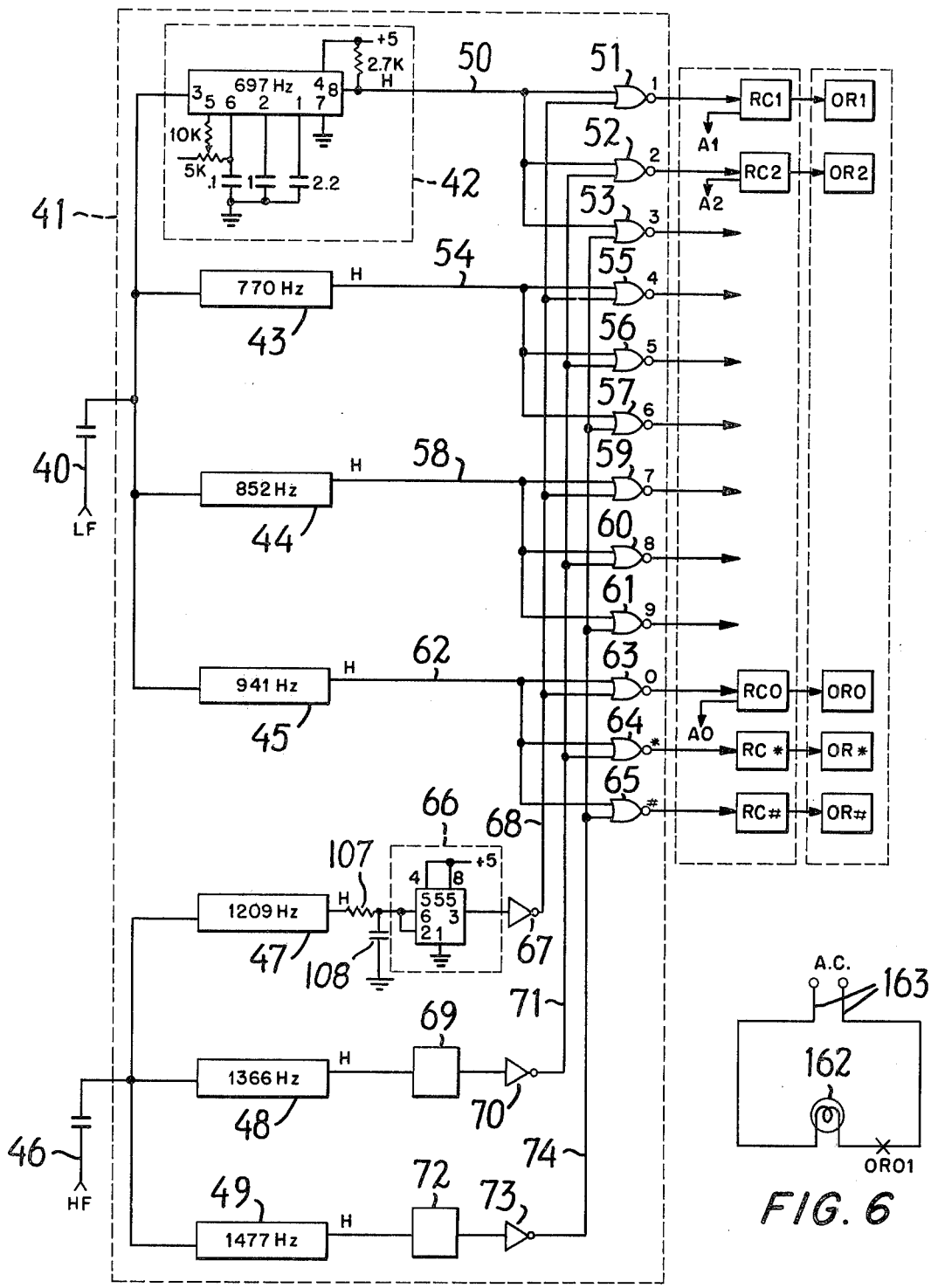
FIG. 3 illustrates schematically a two-tone decoder circuit for use in the apparatus shown in FIG. 1, together with the output relays for effecting a plurality of operations and the control circuits therefor.
FIG. 6 is a schematic diagram illustrating a typical operation for control by the command apparatus of the invention.

The low frequency signal components are fed from the low pass filter 38 through the conductor 40 to the low frequency input terminal of a two-tone signal decoder 41 (FIG. 3). The low frequency portion of the decoder 41 comprises a plurality of type 567 phase-locked-loop circuits 42, 43, 44 and 45 designed to respond, respectively, to the signal frequency components 697 Hz., 770 Hz., 852 Hz and 941 Hz. Similarly the high frequency signal components are supplied from the high pass filter 37 through the conductor 46 to the input terminals of the high frequency portion of the decoder 41 which comprises a plurality of type 567 phase-locked-loop circuits 47, 48 and 49, responsive, respectively, to the signal frequency components 1209 Hz., 1336 Hz., and 1477 Hz.

The output of the phase-locked-loop circuit 42 is connected through the conductor 50 to one input terminal of each of three NOR gates 51, 52 and 53. Similarly, the output of the phase-locked loop circuit 43 is connected through a conductor 54 to one input terminal of each of three NOR gates 55, 56 and 57.

In like fashion, the output of the phase-locked-loop circuit 44 is connected through a conductor 58 to one input terminal of each of the NOR gates 59, 60, and 61, while the output of the phase-locked-loop circuit 45 is connected through a conductor 62 to one input terminal of each of the NOR gates 63, 64 and 65.

The output of the phase-locked loop circuit 47 is connected through a time delay circuit including a series resistor 107 and shunt capacitor 108 to a conventional time delay device 66, the output of which is fed through a signal inverter 67 and a conductor 68 to a second terminal on each of the NOR gates 51, 55, 59 and 63. In similar manner, the output of the phase-locked-loop circuit 48 passes through a conventional time delay device 69, a signal inverter 70 and a conductor 71 to a second input terminal on each of the NOR gates 52, 56, 60 and 64. Also the output of the phase-locked-loop circuit 49 is fed through a conventional time delay device 72, a signal inverter 73 and a conductor 74 to a second input terminal on each of the NOR gates 53, 57, 61 and 65.

The time delay devices 66, 69 and 72 serve to pass output signals from the phase-locked-loop circuits 47, 48 and 49, respectively, only if such signals are of at least one second duration. In this way, voice signals or noise of short duration are prevented from producing a false output.

When no input signals are present, the output signals from the phase-locked-loop circuits 42, 43, 44, 45, 47, 48 and 49 are normally high so that both inputs to each of the NOR gates 51 through 53, inclusive, 55 through 57, inclusive, 59 through 61, inclusive, and 63 through 65, inclusive, are high and the outputs from all of the gates are low. After a caller has acquired control of the command apparatus as described below and depresses a button on his two-tone telephone instrument, however, the outputs of the corresponding phase-locked-loop circuits will be switched from high to low, as will both inputs to the corresponding NOR gate so that the output from that gate will go from low to high.

The outputs of the NOR gates 51 through 53, 55 through 57, 59 through 61 and 63 through 65 are fed to a plurality of like relay control circuits RC0 through RC9 (only RC0, RC1 and RC2 being shown in FIG. 3) RC* and RC#, which are connected to control the energization of a plurality of output relays OR0 through RC9 (only OR0, OR1 and OR2 being shown in FIG. 3) OR* and OR#, respectively. Upon energization of any of the output relays, its contacts are operated to control an operation at the called subscriber's location as described in detail below.

The relay control circuits RC0 through RC9 are identical and it will be necessary to describe only one of them in detail, e.g., the relay control circuit RC0 which is shown in FIG. 5. The relay control circuit RC0 receives the output of the NOR gate 63 (FIG. 3) through a diode 75 and supplies it to the clock terminal of a type 7474 dual D edge-triggered flip-flop 76, the "2" terminal of which is grounded. The "5" terminal of the flip-flop 76 supplies an output, delayed, say 5 ms. in a time delay circuit including a series resistor 77 and a shunt capacitor 78, to one input terminal of a NOR gate 79. A second input terminal of the NOR gate 79 receives the input signal from the diode 75 directly through a conductor 80.

The output of the NOR gate 79 is fed through a conductor 81 and a time delay circuit including a series resistor 82 and a shunt capacitor 83 to the "6" terminal of a type 556 timer 84 which is also connected to the "2" terminal thereof. The time delay circuit serves to introduce a delay of, say, 0.6 second after which a pulse from the "5" terminal of the timer 84 is applied through a conductor 85 to the "4" set terminal of the flip-flop 76 to reset the latter.

The output of the NOR gate 79 is also fed through a normally closed contact T50 on the relay T (FIG. 4) and a conductor A0 to an access code and lockout circuit shown in FIG. 4 and described below. After the caller has acquired access to the command apparatus and the T relay is energized, the output from the NOR gate 79 is also supplied through a conductor 86 and the normally open contact T60 on the T relay (FIG. 4) to a conventional type 741 operational amplifier 87 designed for operation selectively in the saturated or unsaturated mode so that when turned on it stays on and when turned off it stays off.

The output of the amplifier 87 is supplied through a diode 88 and a resistor 89 to the base terminal of a type 2N3565 transistor 90 which has the output relay OR0 connected in the collector circuit thereof. The relay OR0 is shunted by a diode 91 and a resistor 92 is connected between the emitter of the transistor 90 and ground.

The relay control circuit RC0 also incorporates on-off detector means OOD enabling a caller to determine whether a circuit that he wishes to operate is in the operated or unoperated condition. For this purpose, the high signal produced across the resistor 92 when the output relay OR0 is energized is supplied through a conductor 93 to one input terminal of a three input NAND gate 94 which receives a second input signal directly from the output of the NOR gate 63 through a conductor 95. The third input terminal of the NAND gate 94 is normally connected to ground through a closed contact OR#1 on the output relay OR# but is adapted to be connected to a source of positive supply voltage when a normally open relay contact OR#2 is closed.

The output of the NAND gate 94 is fed through a conductor 96, a diode 97, and a conductor E0 to the "5" terminal of a type 555 timer 98 connected as an oscillator operating normally at a frequency of, say, 100 Hz. The oscillator circuit is designed so that when the signal applied to the "5" terminal of the timer 98 is high, the oscillator frequency is 100 Hz; when the signal is low, the frequency increases to, say 200 Hz. The output signal at the "3" terminal of the oscillator 98 is fed through a capacitor 99, a conductor 100 and a normally open relay contact OR#3 to the lower conductor 12 of the incoming telephone line (FIG. 2).

Normally, the output of the NAND gate 94 is high and under this condition the frequency of the oscillator 98 is 100 Hz. as stated above. When, however, all of the inputs to the NAND gate 94 are high, as is the case when the output relay OR0 is in the operated position at the time of a test, the output then goes low and causes the frequency of the oscillator 98 to increase to 200 cycles. Since the change in frequency is audible in the calling telephone receiver, it serves as an indication to the caller that the relay OR0 is in the operated condition.

On testing for the condition of any of the other output relays OR1–OR9, similar output signals from the relay control circuits RC1–RC9 may be applied to the "5" terminal of the oscillator 98 over the conductors E1–E9 so that the condition of any output relay may be determined.

Before the relay T is energized as described below, the relay control circuits route signals representative of two-tone signals dialled by the caller to the access and lockout circuit ALC shown in FIG. 4. If the digital access code is 0, 1, 2, such signals are supplied from the relay control circuits RC0, RC1 and RC2 over the conductors A0, A1 and A2, respectively. In the interest of simplicity, the corresponding conductors for the remaining relay control circuits are not shown.

The conductors A0, A1 and A2 are connected through conventional signal inverters I0, I1 and I2 and diodes Da0, Da1, and Da2, respectively, to circularly arranged fixed contact segments Ca0, Ca1 and Ca2 on a conventional thumb wheel switch 102a. The switch 102a also has contact segments Ca3–Ca9 adapted to receive signals from the other control relay circuits through conductors (not shown).

A segmental contact ring 103a on the switch 102a is disposed to engage simultaneously all of the contact segments Ca0–Ca9 but one and a movable contact arm 104a is positioned between the ends of the ring 103a so as to engage the one contact segment not engaged by the latter. It will be understood that the switch 102a can be set manually to cause one of the contact segments Ca0–Ca9 to be engaged by the contact arm 104a and all of the other contacts to be engaged by the contact ring 103a.

The outputs of the signal inverters I0, I1 and I2 are also connected through the conductors B0, B1 and B2 and the diodes Db0, Db1 and Db2 to fixed contact segments Cb0, Cb1 and Cb2, respectively, on a second thumb wheel switch 102b like the switch 102a, like parts of the former being denoted by like reference numerals with the reference character b substituted for a. The contact segments Cb3–Cb9 on the switch 102b are connected through similar conductors and signal inverters (not shown) to receive signals from the other relay control circuits for the "3" through "9" digits.

In similar fashion, the outputs of the signal inverters I0, I1 and I2 are supplied by the conductors C0, C1 and C2 through the diodes Dc0, Dc1 and Dc2, respectively, to the contact segments Cc0, Cc1 and Cc2 on a third thumb wheel switch 102c like the switch 102a, and like parts of the former are designated by like reference characters with the reference character c instead of a. Also, the contact segments Cc3–Cc9 on the switch 102c are connected through similar conductors, signal inverters and diodes (not shown) to receive signals from the relay control circuits for the "3" through "9" digits.

It will be understood that by adjustment of the thumb wheel switches 102a, 102b and 102c, a selected 3-digit access code can be set into the apparatus. Thus, the thumb wheels in FIG. 4 are set for an access code 0, 1, 2.

The rotatable contact arm 104c of the thumb wheel switch 102c is connected by a conductor 119 to the "3" clock terminal of a conventional dual D, edge-triggered flip-flop 120 which has its "2" and "4" terminal connected to a positive voltage supply.

The "5" terminal of the flip-flop 120 is connected through a time delay circuit including a series resistor 123 and a shunt capacitor 124 to the "2" and "6" terminals of a type 55 timer 125, the "3" terminal of which is connected through a diode 126 to the "1" or clear terminal of the flip-flop 120. This last circuit functions to reset the flip-flop 120 to ground in the event that the caller does not complete his call within, say, 45 seconds after it has been initiated.

The "∓6" contact of the flip-flop 120 is connected through a time delay circuit including a series resistor 121 and a shunt capacitor 122 to the "6" and 2 terminals of one-half of a conventional type 556 timer 127. The output of the timer 127 is fed from the "5" terminal thereof through a conductor 128 to the "1" or clear terminal of another type 7474 flip-flop 129, the "3" clock terminal of which is connected to receive signals from the movable contact 104a on the thumb wheel switch 102a through a conductor 130.

The "2" and "4" terminals of the flip-flop 129 are connected to a positive source of voltage and the "6" output terminal is connected through a time delay circuit including a series resistor 131 and a shunt capacitor 132 to the "8" terminal of one-half of a type 556 timer 133. The "8" terminal of the timer 133 is connected to the "12" terminal thereof and the "9" terminal is connected through a conductor 134 to the "1" clear terminal of another type 7474 flip-flop 135. The "3" clock terminal of the flip-flop 135 is connected by a conductor 136 to the movable contact 104b on the thumb wheel switch 102b. The output from the "6" terminal of the flip-flop 135 is connected through a conductor 137 to one input terminal of a NOR gate 138 and through a conductor 139 and diode 140 to the "1" clear terminal of the flip-flop 120 to reset the latter.

The ring contact 103c on the thumb wheel switch 102c is connected through a conductor 141 to the "11" clock terminal of a type 7474 flip-flop 142 which has its "12" and "10" terminals connected to a source of positive voltage. The "13" clear terminal of the flip-flop 142 is also connected to receive the output of the "6" terminal of the flip-flop 120 through a diode 105 and a conductor 106. The output from the flip-flop 142 is fed from its "8" terminal through a conductor 143, a diode 144 and a conductor 145 to the "2" terminal of a type 555 timer 146 which is connected in a circuit designed to provide a high output at its "3" terminal whenever there is a low input to its "2" input terminal and to hold that output for, say 3 minutes.

The output from the "3" terminal of the timer 146 is supplied through a conductor 160 to a second input terminal of the NOR gate 138. This output is also fed through a signal inverter 147 and a diode 148 to the "13" clear terminal of the flip-flop 142 and through a diode 149 to the "1" clear terminal of the flip-flop 120. As described later, the timer 146 receives an input at its "2" terminal only when a wrong digit is dialed by the caller and in such case it serves to reset both of the flip-flops 120 and 142 and to render them incapable of responding to input signals for a period of 3 minutes.

The ring contact 103a on the thumb wheel switch 102a is similarly connected by a conductor 150 to the "11" clock terminal of a type 7474 flip-flop 151 having a "13" clear terminal connected by a conductor 152 and a diode 153 to receive a signal from the "5" terminal of the timer 127. The "13" clear terminal of the flip-flop 151 is also connected to receive an input from the "6" output terminal of the flip-flop 129 through a conductor 154 and a diode 155. The "8" output terminal of the flip-flop 151 is connected through a diode 156 of the conductor 145 leading to the "2" terminal of the timer 146.

The ring contact 103b of the thumb wheel switch 102b is connected through a conductor 157 to the "11" clock terminal of a type 7474 flip-flop 158. The "13" clear terminal of the flip-flop 158 is connected by a conductor 159 to the "1" terminal of the flip-flop 135 and its "10" and "12" terminals are connected to a positive source of voltage. The output from the "8" terminal of the flip-flop 158 is connected through a diode 161 and the conductor 145 to the "2" terminal of the timer 145.

The output relays are provided with contacts and appropriate circuitry (not shown) to initiate different operations at the called location. For example, the output relay OR0 may be provided with normally open contact OR01 (FIG. 6) in a circuit including an electric lamp 162 and a source of alternating current 163. Through use of the command apparatus as described below, a remote caller can operate the relay OR0 to close or open its contact OR01 and connect the lamp 162 to, or disconnect it from the alternating current source 163.

Operation

In operation, the remote caller dials the number at which the command apparatus is located in the usual way. When the connection is made, ringing current appears on the incoming wires 12, producing an output from the rectifier 19 which energizes the delay R (FIGS. 1 and 2). Since conventional ringing current is usually on for 2 seconds and off for 4 seconds, actually the relay R is energized for periods of 2 seconds at 4 second intervals. Energization of the relay R closes its contact R1, grounding the "6" terminal of the timer 26. This causes the output at the timer "5" terminal to go high immediately and energize the relay Ra. The timer 27 maintains the relay Ra energized for a period of about 40 seconds thereafter so as to allow the caller sufficient time to acquire access to the command apparatus as described below. Closing of the relay contact Ra1 connects the high side of the secondary winding 15 of the transformer 14 through the conductor 34 to the amplifier 35.

In between rings, the caller now depresses the buttons on his telephone instrument corresponding to the 3 digit access code 0, 1, 2 set into the thumb wheel switches 102c, 102a, and 102b, respectively, (FIG. 4). This produces sequential two-tone signals which are transmitted through the amplifier 35, separated into high and low frequency components in the filters 37 and 38, decoded in the decoder 41 (FIG. 3) and supplied from the appropriate ones of the relay control circuits to the access code and lock-out circuit ALC.

If the three digits are correctly dialled, high signals will appear sequentially on the conductors A0, A1 and A2 (FIGS. 3 and 4) in that order. The high signal on the conductor A0 is converted to a low signal in the inverter I0 which is fed through the conductor C0, the diode Dc0, the switch contact segment Cc0 engaging the movable switch arm 104c on the thumb wheel switch 102c and the conductor 119 to the "3" clock terminal on the flip-flop 120. Since no low signal is being applied to the "1" clear terminal of the flip-flop 120 at this time, the clock signal switches the flip-flop "5" and "6" output terminals from low and high, respectively, to high and low respectively.

Although the high signal on the conductor A0 is also fed to the contact segments Ca0 and Cb0 which are engaged with the contact rings 103a and 103b, respectively, the diodes in the lines to the contact segments engaging the contact rings (e.g., the diodes Da0, Da2, Db0 and Db1) prevent this signal from reaching the "11" clock terminal of the flip-flop 142.

The low output signal transmitted through the diode 105 and the conductor 106 to the "13" terminal of the flip-flop 142 disables the latter. The low output signal after a delay of, say, 2 seconds is also impressed upon the "6" terminal of the timer 127 causing the output at its "5" terminal to switch fron low to high and applying a high signal to the "1" clear terminal of the flip-flop 129. Accordingly, the flip-flop 129 is now enabled to respond to a clock signal applied at its "3" terminal.

When a high signal representing the next digit "1" dialled by the caller is transmitted from the signal inverter I1 through the diode Da1, the contact segment Ca1 engaging the rotatable contact arm 104a of the thumb wheel switch 102a and the conductor 130 to the "3" clock terminal of the flip-flop 129, the output at the "6" terminal of the latter is switched from high to low. This low output is transmitted through the diode 155 and the conductors 154 and 152 to the "13" terminal of the flip-flop 151 and disables the latter. The same low output after a delay of about 2 seconds is impressed upon the "8" terminal of the timer 133, causing the output at its "9" terminal to go from low to high.

The high output from the timer 133 is fed through the conductor 134 to the "1" clear terminal of the flip-flop 135 and also through the conductor 159 to the "13" clear terminal of the flip-flop 158, thus readying the flip-flops 135 and 158 to respond to clock pulses at the "3" and "13" terminals thereof, respectively.

When, now, the two tone signal representing the third digit "2" is transmitted, the output of the signal inverter I2 is switched from high to low. The low signal is transmitted through the conductor B2, the contact segment Cb2 engaging the rotatable contact arm 104b on the thumb wheel switch 102b and the conductor 136 to the "3" clock terminal of the flip-flop 135, causing the output at its "6" terminal to be switched from high to low. The low output signal is transmitted through the conductor 137 to one input terminal of the NOR gate 138. Since the timer 146 has not been actuated in response to a wrong digit, the input at the other input terminal of the NOR gate 138 is also low so that its output now goes from low to high.

The high output from the gate 138 is transmitted through an inverter 162 to provide a low output signal which, after a delay of about one second in a time delay circuit including a series resistor 163 and a shunt capacitor 164, is impressed upon the "6" terminal of a type 556 timer 165. The output of the "5" terminal of the timer 165 is now switched from low to high and the high output transmitted through the diode 166 energizes the relay T, closing its contacts T1, T2, T3, T60 and T7 and opening contacts T4 and T50.

The closing of the contacts T1 connects the two halves of the transformer primary winding 13 (FIG. 2) in series through the resistor 17 so that the incoming line is now properly terminated.

Closing of the relay contacts T7 (FIG. 4) and T2 (FIG. 2) connects the T and Ra relays, respectively, directly to sources of positive voltage so that they are maintained energized until the call is terminated. Closing of the contacts T3 and the opening of the contacts T4 (FIG. 2) cuts the amplifier 35 out of the circuit, since the signal level in the terminated line is much higher than it was before the line was properly terminated and the amplifier is no longer needed. Closing of the relay contacts T60 (of which there is one for each relay circuit) connects the latter to route control signals to the output relays in response to the depression of buttons by the caller. The opening of the contacts T50 (of which there is one for each relay control circuit) disconnects the latter from the access and lockout circuit.

Suppose now that the caller desires to turn on a lamp 162 connected through contacts OR01 on the relay OR0 to a source 163 of energy (FIG. 6). This is accomplished by his depressing the "0" button on his calling instrument which results in energization of the relay OR and the closing of its contacts OR01 to effect this result. It will be apparent that other operations at the called location may be controlled by a remote caller in a similar manner through suitable circuits (not shown) having contacts on output relays corresponding to other digits.

In the event the caller wishes to ascertain the operative condition of a particular output relay (e.g., the relay OR0) before attempting to energize it, he depresses the "#" key on his telephone instrument which results eventually in energization of the output relay OR# thereby closing the relay contacts OR#2 and OR#4 in FIG. 5 and OR#3 in FIG. 2, and opening the normally closed contacts OR#1 (FIG. 5). The relay OR# has like contacts in each of the output relay control circuits for the digits "0" through "9".

The closing of the OR#4 contacts connects the "3" input terminal of the flip-flop 76 in the relay control circuit RC0 to ground through a diode 167 and similar relay contacts (not shown) in the other relay control circuits for the digits "1" through "9" disable the latter in like manner.

The closing of the relay contacts OR#3 (FIG. 1) connects the oscillator 98 (FIG. 5) to one of the incoming telephone wires 12 (FIG. 1).

The opening of the contacts OR#1 disconnects one input terminal of the NAND gate 94 (FIG. 5) from ground while the closing of the contacts OR#2 connects that input terminal to a source of positive voltage.

If the relay OR0 whose condition is to be tested is in the operated position, then a positive signal from the resistor 92 (FIG. 5) will be impressed upon a second input terminal of the NAND gate 94 through the conductor 93. Accordingly, if the remote caller now depresses the "0" key on his telephone instrument, it will cause a positive input signal to be applied to the third input terminal of NAND gate 94 through the conductor 95 (FIG. 5), so that its output will be switched from high to low causing the frequency of the oscillator 98 to increase from about 100 Hz. to about 200 Hz. Since the output of the oscillator 98 is now connected to one of the wires of the incoming telephone line, the change in frequency will be audible to the caller and will indicate to him that the relay OR0 is in the operated condition.

Had the relay OR0 not been in the operated position, the input from the resistor 92 (FIG. 5) to the NAND gate 94 would have been low so that there would have been no change in the frequency of the oscillator 98 when the "0" button on the sending instrument was depressed by the caller.

After a test for the condition of one of the output relays has been completed, it is only necessary for the caller to depress the "#" button on his telephone instrument again to deenergize the relay OR# and restore its contacts to their initial conditions as shown in the figures.

Normally, the command apparatus is released by the caller at the conclusion of a call by depression of the "*" button on the calling telephone instrument. This results in energization of the output relay OR*, closing its contacts OR*1 (FIG. 2). This connects a release relay RLS for energization directly from a source of positive voltage causing the normally closed contacts RLS1 (FIG. 4) to be opened. This deenergizes the T relay and restores its contacts to their initial positions. The caller may then replace his receiver on the hook.

If the caller should hang up without depressing the "*" button to release the circuit, the usual dial tone or permanent signal generated by the telephone company central office will be supplied from the secondary winding of the transformer 15 (FIG. 2) through a capacitor 175 to the "3" terminal of a type 567 phase-locked-loop circuit 176 designed to have a broad enough band width to respond to both of these signals. This will cause the "8" output terminal of the phase-locked-loop circuit 176 to be switched from high to low. The low output is transmitted through one unit of a type 7407 non-inverting buffer 180 and a time delay circuit including a series resistor 177 and shunt capacitor 178 to the "6" and "2" terminals of a type 555 timer circuit 179, causing the output signal at the "3" terminal thereof to go high. This energizes the release relay RLS and restores the phone command apparatus to its initial inoperative condition as described above.

In the event the caller makes an error in dialling the access code initially (e.g., he dials a wrong digit, or the correct digit in the wrong sequence), the access code and lock-out circuit is immediately disabled and rendered non-responsive to incoming signals for a specified period (e.g., 3 minutes). For example, suppose that the caller were to dial the digit 9 first, instead of the correct digit 0. This would result in the application of a low signal through the ring contact 103c on the thumb wheel switch 102c, and the conductor 141 to the "11" clock terminal of the flip-flop 142 causing the output at its "8" terminal to be switched from high to low. The low signal thus generated is supplied to the "2" terminal of the timer 146 so that the output of the inverter 147 is switched from high to low. The low output signal is supplied to the "1" and "13" clear terminals of the flip-flops 120 and 142, respectively, disabling both of the latter for a period of 3 minutes. At the same time, a high signal is fed from the "3" terminal of the timer 146 through the conductor 160 to one input terminal of the NOR gate 138 so that its output cannot possibly be switched from low to high.

Similarly, if the first digit is correctly dialled but the second is not, the output at the "8" terminal of the flip-flop 151 will be switched from high to low. This will trigger the timer 146 and again result in the application of a high signal to one input terminal of the gate 138, rendering its output incapable of being switched from low to high. Also, in the absence of a clock signal on the "3" terminal of the flip-flop 129 the inputs at the "1" and "13" clear terminals of the flip-flops 135 and 158, respectively, will remain low so that they will not respond even if clock signals are applied to their "3" and "11" terminals, respectively.

In the event the first and second digits have been correctly dialled but the third is wrong, this will result in the application of a low signal to the "11" clock terminal of the flip-flop 158 causing the high output at its "8" terminal to be switched to low. This will trigger the timer 146 as described above and cause a high pulse to be applied to one input terminal of the NOR gate 138, rendering the latter incapable of switching its output from low to high to energize the relay T.

If the caller does not acquire access to the command apparatus within 45 seconds after initiating a call, the output at the "5" terminal of the timer 125 (FIG. 4) is switched from high to low, resulting in the application of low pulses to the "1" and "13" clear terminals of the flip-flops 120 and 142, respectively, thereby resetting them.

The invention thus provides novel and highly effective telephone command apparatus which enables a remote caller to control selectively any one of a number of operations at a called subscriber's location. By virtue of the novel multidigit code access and lockout device incorporated in the apparatus, a very high degree of security for controlling its accessibility obtains. Also, the condition testing and automatic circuit release impart versatility to the apparatus and minimize the likelihood of its being disabled inadvertently by the failure of a caller to take affirmative steps to release it.

The specific embodiment described and illustrated herein is obviously susceptible of modification in form and detail without departing from the spirit of the invention. For example, other equivalent components may be used instead of the specific time delay, flip-flop, and phase-locked-loop circuits shown in the figures. Accordingly, the invention is not to be limited to the illustrative embodiment disclosed but encompasses all modifications coming within the scope of the following claims.

I claim:

1. Telephone command apparatus comprising
   (a) signal transmission channel means,
   (b) input circuit means connectible to a telephone line and responsive to telephone ringing signals for conditioning said signal transmission means to transmit signals therethrough,
   (c) decoder means in said transmission channel means for providing a plurality of separate outputs representative, respectively, of a plurality of coded signals supplied as inputs thereto through said channel means,
   (d) a plurality of controllable means for effecting a plurality of operations, respectively,
   (e) a plurality of control means for actuating said respective controllable means, said control means being initially disabled to receive the outputs from said decoder means, and
   (f) access control means initially enabled to receive the outputs from said decoder means and responsive to a predetermined combination of said separate outputs representative of a predetermined combination of first coded signals supplied to said input circuit means for enabling said plurality of control means to receive from said decoder means separate outputs, respectively, representative of other coded signals supplied to said input circuit means, whereby said controllable means may be selectively actuated in response to said other coded signals supplied to said input circuit means from said telephone line.

2. Telephone command apparatus as defined in claim 1 in which the input circuit means includes an impedance connectible to the telephone line to terminate the same and the access control means also controls the termination of the telephone line in said impedance in response to said combination of separate outputs.

3. Telephone command apparatus as defined in claim 2 in which the decoder means in the channel transmission means is responsive to periodically varying signals of different characteristics, respectively, and provides a plurality of separate outputs representative of said respective periodically varying signals.

4. Telephone command apparatus as defined in claim 3 for use in a telephone system in which the control digits are represented by a plurality of different, two-tone signals, each having a high frequency component and a low frequency component, in which the signal transmission means includes filter means for separating out the high frequency and the low frequency components of the two-tone signals, and the decoder means, in response to said high frequency and low frequency components, produces a plurality of separate outputs corresponding to the respective two-tone signals.

5. Telephone command apparatus as defined in claim 1 in which the access control means is also responsive to separate outputs other than said predetermined combination from said decoder means for temporarily disabling the access control means.

6. Telephone command apparatus as defined in claim 1 in which the access control means is responsive to a predetermined combination of said separate outputs that is representative of a predetermined multi-digit code and includes settable means for selecting the predetermined code to which it is to be responsive.

7. Telephone command apparatus as defined in claim 1 in which the access control means includes means rendered operative in response to one of the outputs in said predetermined combination for restoring the access control means to an initial condition in the event said predetermined combination of outputs is not received by the access control means within a predetermined time interval.

8. Telephone command apparatus as defined in claim 6 in which the access control means comprises
   (1) settable selector switch means for each digit of said predetermined code, each of said switch means having a plurality of fixed contacts connected to receive the respective outputs from said decoder means, a first movable contact positionable to select one of said fixed contacts thereon and a second movable contact positionable to engage simultaneously all of the other contacts thereon,
   (2) a first series of cascaded flip-flops connected to be independently clocked by signals from the first movable contacts of said switch means, respectively, each of said flip-flops being connected to pass its input to the next succeeding flip-flop when it receives a clocking signal, and the last of said flip-flops being connected to reset the first when the former is clocked,
   (3) a second series of flip-flops connected to be independently clocked by signals from the second movable contacts of said switch means, respectively, each of said flip-flops after the first in the second series being connected to be enabled by the output of the preceding flip-flop in the first series when the latter is clocked,
   (4) time delay flip-flop means connected normally to render the first flip-flop in both of said first and second series in condition to respond to clocking signals, respectively, and connected to be triggered by any clocked flip-flop in the second series to render the first flip-flop in both of said first and second series for a given time interval incapable of responding to clocking signals, and
   (5) means jointly responsive to the output signal from said time delay flip-flop means and to the output of the last flip-flop in said first series for controlling the connections of said plurality of control means to receive the outputs of said decoder means, respectively.

9. Telephone command apparatus as defined in claim 8 together with second time delay flip-flop means responsive to passage of the input of the first flip-flop in the first series when clocked to the second flip-flop therein for resetting said first flip-flop in the first series after a predetermined time delay.

10. Telephone command apparatus as defined in claim 2 together with call terminating means responsive to signals transmitted through said channel means for disconnecting said control means from said channel means and for disconnecting said terminating impedance from the telephone line.

11. Telephone command apparatus as defined in claim 10 in which said call terminating means is responsive to a predetermined two-tone signal on the telephone line to which the apparatus is to be connected.

12. Telephone command apparatus as defined in claim 10 in which said call terminating means is responsive to a dial tone on the telephone line to which the apparatus is to be connected.

13. In a telephone command apparatus including a two-position controllable means for effecting an operation, control means for said controllable means, input circuit means connectible to a telephone line, and signal transmission channel means for transmitting a first signal from said telephone line to said control means, means for determining the position of said controllable means from a remote calling location comprising
   (a) means providing a second signal representative of the position of said controllable means,
   (b) signal generator means jointly responsive to said first and second signals and to a test control signal transmitted over said signal transmission channel means for generating one or the other of two different signals representative of the condition of said controllable means,
   (c) and means for supplying said generated signal to said input means for connection to said telephone line.

14. Apparatus as defined in claim 13 in which the signal generator means is an oscillator for generating one or the other of two signals of different frequency representative, respectively, of the condition of said controllable means, the signal supplying means is responsive to said test control signal, and means also responsive to said test control signal is provided for disabling said control means to render it temporarily incapable of response to signals transmitted over said signal transmission channel.

15. Telephone command apparatus as defined in claim 13 in which there are a plurality of two-position controllable means for effecting a plurality of operations and a plurality of control means for the respective controllable means responsive, respectively, to a plurality of first signals transmitted over said channel means, a plurality of means providing second signals representative of the position of each of said controllable means, respectively, and a plurality of detector means each jointly responsive, respectively, to the first and second signals corresponding to said respective control means and to a test control signal transmitted over said channel means for actuating the signal generator means to generate detectably different signals representative of the two conditions of a selected controllable means.

16. Telephone command apparatus as defined in claim 15 in which the first signals and the test control signal transmitted over the transmission channel means are two-tone signals representative, respectively, of dialled digits in a two-tone telephone system, the signal generator means is an oscillator actuatable to generate signals of different frequency representative, respectively, of the two conditions of a selected controllable means, and means also responsive to said test control signal is provided for disabling said control means to render it temporarily incapable of response to signals transmitted over said signal transmission channel.

* * * * *